United States Patent [19]

Cameron et al.

[11] Patent Number: 4,552,793
[45] Date of Patent: Nov. 12, 1985

[54] REORIENTED GLASS FIBER BOARD PRODUCT

[75] Inventors: Neil M. Cameron, Sarnia; Phillip W. Blackmore, Camlachie, both of Canada

[73] Assignee: Fiberglas Canada Inc., Toronto, Canada

[21] Appl. No.: 591,641

[22] Filed: Mar. 20, 1984

[30] Foreign Application Priority Data

Oct. 24, 1983 [CA] Canada ................................... 439540

[51] Int. Cl.⁴ ............................................... B32B 3/00
[52] U.S. Cl. ......................................... 428/53; 65/4.4; 428/192; 428/284; 428/285; 428/440; 428/491; 428/426
[58] Field of Search ............... 428/292, 294, 343, 354, 428/369, 370, 152, 181, 53, 284, 285, 192, 440, 491; 65/4.4

[56] References Cited

U.S. PATENT DOCUMENTS 3,012,923 12/1961 Slayter ................................. 156/144

Primary Examiner—James J. Bell
Attorney, Agent, or Firm—Sughrue, Mion, Zinn, Macpeak and Seas

[57] ABSTRACT

A glass fiber board product exhibits substantially improved compressive strength and is formed from a laminar mat of glass fiber containing a bonding substance. The mat is processed to rearrange the laminations of the mat so that at least a major portion extends across the thickness of the mat and the mat is then heat-cured and cut perpendicular to the major surfaces of the mat to form strips having opposite longitudinal cut faces. The strips are adhered together in side-by-side relationship to form boards with the cut faces forming opposite major surfaces of the boards. A backing sheet may be adhered to one or both sides of the board. Alternatively, boards cut from the cured mat are adhered together in stacks, which are then cut perpendicular to the boards.

12 Claims, 14 Drawing Figures

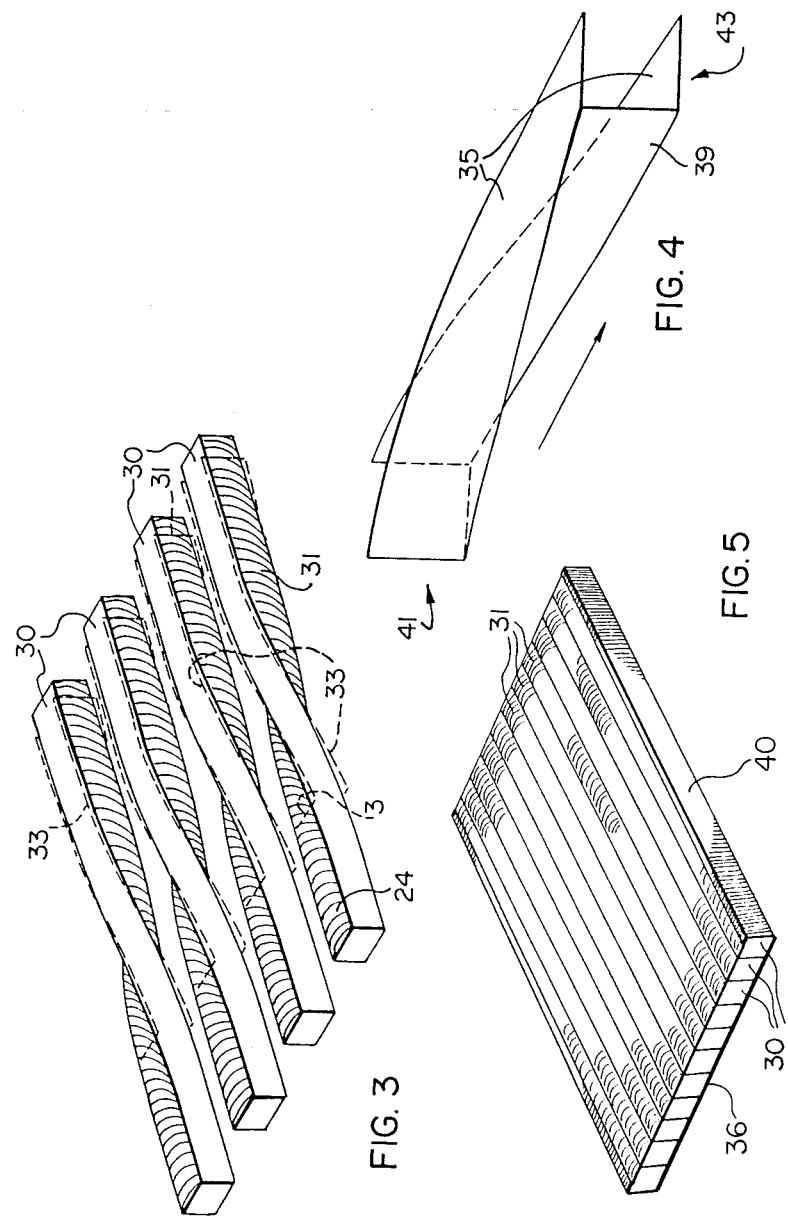

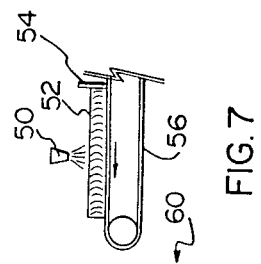
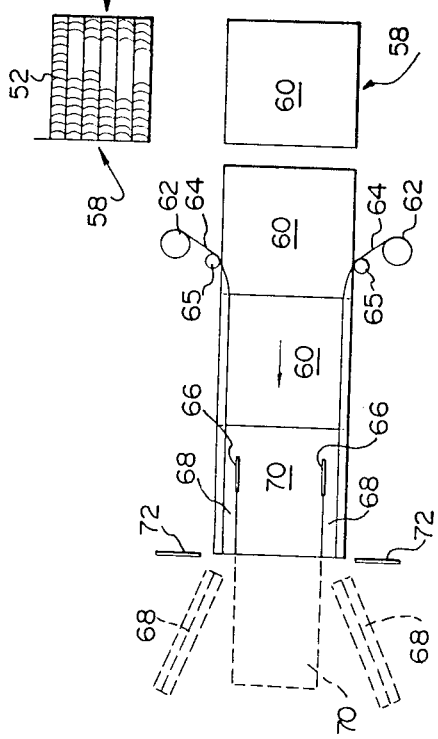
FIG. 7
FIG. 8

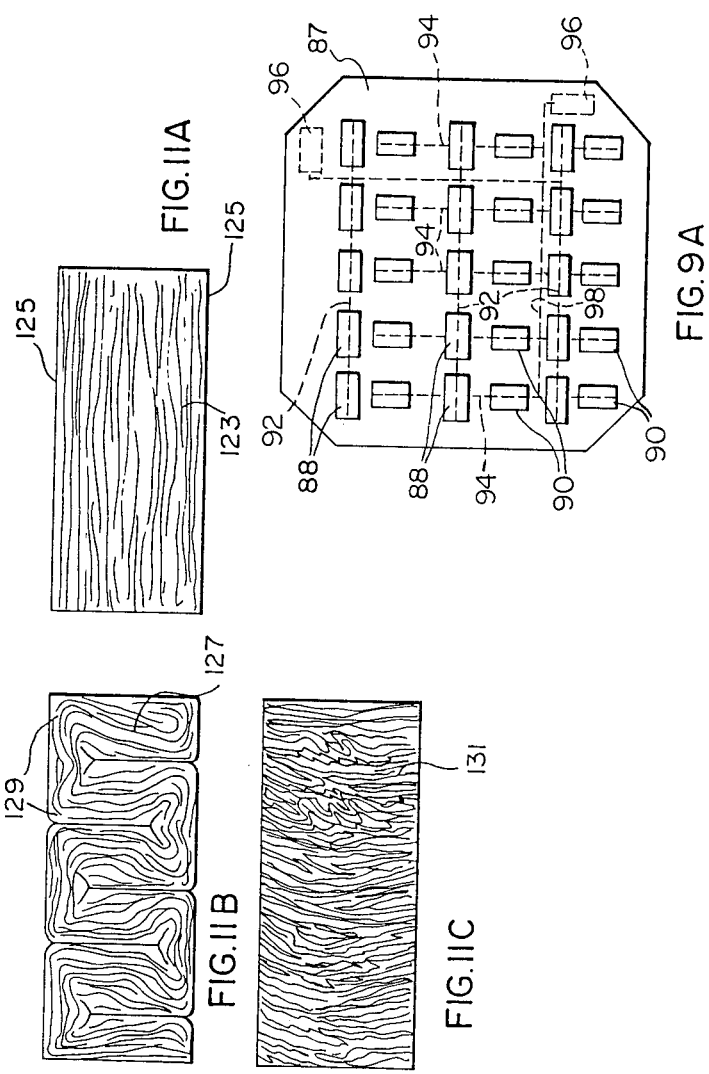

REORIENTED GLASS FIBER BOARD PRODUCT

FIELD OF THE INVENTION

The present invention relates to a fibrous material product made from a laminar mat of glass fiber containing a bonding substance and is useful, for example, as a glass fiber roofing board.

The invention further relates to a method of and an apparatus for the production of such a product.

DESCRIPTION OF THE PRIOR ART

Glass fiber products for thermal insulation are conventionally manufactured from a mat which is formed by attenuating glass fibers from one or more spinners in a forming section, the glass fibers being deposited onto a conveyor in a continuous manner so as to form a multiplicity of the glass fibers randomly arranged parallel to the plane of the conveyor. A suitable binding substance is sprayed onto the glass fibers as they are deposited on the conveyor, and the resulting mat is advanced by the conveyor through a heating chamber or curing station, where the mat is compacted and the binding substance is cured or polymerized to bind the glass fibers together in the compacted mat.

As is well known to those skilled in the art, a mat formed in this way has a laminar structure, since the glass fibers are disposed on the conveyor in layers extending in planes substantially parallel to the conveyor and, thus, to the major surfaces of the mat, the glass fibers being randomly arranged in other directions.

It is also known that a glass fiber mat manufactured in this way exhibits a greater compression strength in a direction parallel to its laminations than in a direction at right angles to its laminations.

In addition, it is also known, in order to increase the compression strength of the mat in a direction perpendicular to the major surfaces of the mat, to pleat the mat before the binding substance is cured.

Pleating of a glass fiber mat is conventionally effected by passing the mat between successive pairs of upper and lower conveyors, the conveyors contacting the upper and lower major surfaces of the mat and the pairs of conveyors being driven at successively slower speeds so that the mat is folded up and drawn or pleated between the conveyors and, thus, the laminations are folded so that, in the structure of the pleated glass fiber mat, at least a substantial portion of the glass fiber laminations extend in planes at least substantially perpendicular to the opposite major surfaces of the pleated mat, i.e. across the thickness of the mat. Examples of methods of and apparatus for effecting such pleating of a glass fiber mat are given in U.S. Pat. No. 2,409,066, issued Oct. 8, 1946 to Edward R. Powell et al and U.S. Pat. No. 2,500,690, issued Mar. 14, 1980 to George M. Lannan.

The aforesaid U.S. Pat. No. 2,409,066 also shows that short mineral wool fibers can be randomly oriented by allowing a falling operation to take place, thus effectively increasing the percentage of vertical fibers in the mat.

This process produces a product where there are no evident changes in direction in the fibers of the finished mat, thus producing in the cured product a more homogeneous appearance with greater uniformity of the major surfaces. Weak areas produced by the change of direction in pleating are eliminated.

However, the process disclosed in the aforesaid U.S. Pat. No. 2,409,066 is not available to the glass fiber industry because the lengths of the glass fibers produced and utilized in that industry are much greater than in mineral wool, to which this prior patent relates. The lengths of glass fibers cause much intertwining in the mat and prevent the falling action disclosed in this prior patent from occurring.

In U.S. Pat. No. 3,012,923, issued Dec. 12, 1961 to G. Slayter, there are disclosed fibrous products, for example fibrous tube coverings, which are manufactured by cutting an advancing laminar mat of glass fibers into successive sections, rearranging and assembling these sections in abutting relationship to form an assembly of mat sections in which the edge regions of the sections form the major surfaces of a reformed mat structure, compressing this mat structure and adhering an inextensible backing sheet to the edge regions of the sections forming one of the major surfaces of the reformed mat structure. In this reformed mat structure, the fibers, which in the original mat were generally parallel to the opposite major surfaces of the mat, extend generally perpendicular to the opposite major surfaces of the reformed mat structure.

A somewhat similar method for the manufacturing of a reformed mat structure in a continuous manner is disclosed in Canadian Pat. No. 909,130, issued Sept. 5, 1972 to Gullfiber AB, in which a fiber mat is folded along fold lines extending perpendicular to the longitudinal direction of the fiber mat, the parts of the fiber mat being pressed together, and a binder in the fibers being subsequently cured, as the fiber mat is continuously advanced along a path of travel on a production line.

However, neither the aforesaid U.S. Pat. No. 3,012,923 nor the aforesaid Canadian Pat. No. 909,130 suggests pleating or crimping of the mat before cutting and rearranging the cut portions of the mat.

BRIEF SUMMARY OF THE INVENTION

The present inventors have now surprisingly found that a board or like product having a substantially increased compression strength can be made from a laminar glass fiber mat if the laminations of the mat are firstly rearranged in a suitable manner, before the mat is cut into sections and reassembled, instead of effecting such cutting while the laminations remain in their initial orientation, i.e. parallel to the major surfaces of the mat.

More particularly, the present inventors have found that increased compression strength is obtained in the finished product if the laminations are rearranged from their initial orientation, so that at least a major portion of the rearranged laminations become disposed in directions extending across the thickness of the mat, prior to the cutting of the mat into portions for subsequent reassembly.

It is accordingly an object of the present invention to provide a fibrous material product formed from a mat of glass fiber which exhibits a substantially increased compression strength as compared with comparable prior art products.

It is a further object of the present invention to provide a novel and improved method of and apparatus for the production of such fibrous material product.

According to the present invention, there is provided a fibrous material product formed from a mat of glass fiber containing a bonding substance and having fiber laminations which have been rearranged from an initial orientation, in which the laminations extend generally parallel to opposite major surfaces of the mat, to a reorientation in which at least a major portion of the laminations extend across the thickness of the mat, the mat being heat-cured and cut perpendicular to the major surfaces of the mat to form strips having opposite longitudinal cut faces, and means securing the strips together in side-by-side relationship to form an assembly, the cut faces forming opposite major surfaces of the assembly.

Normally, the assembly of the reassembled strips will be in the form of a slab or board, in which case the thickness of the slab or board will be determined by the widths of the strips into which the original mat is cut.

The reassembled strips are preferably secured to one another by an adhesive on the uncut faces of the strips and by a backing sheet secured by adhesive to one or both of the major surfaces of the assembly.

The present invention also provides a method of making a product from a mat of glass fiber material containing a bonding substance and having glass fiber laminations extending generally parallel to opposite major surfaces of the mat, which comprises the steps of rearranging the laminations of the mat so that at least a major portion of the laminations are disposed in directions extending across the thickness of the mat, heat-curing the mat to harden the bonding substance, cutting the cured mat to form mat strips having opposite cut faces, disposing the strips with the cut faces in mutually parallel relationship to form opposite major surfaces of the product, and securing the strips together.

The rearrangement of the laminations is preferably effected by passing the mat between successive pairs of conveyor belts which press against the opposite major surfaces of the mat, the pairs of conveyors being driven at slower speeds, in succession along the path of travel of the mat. The conveyors are preferably spaced apart by a distance such as to avoid pleating the mat and thus to avoid weak areas at the surfaces of the mat as described in greater detail hereinafter. However, the invention also includes pleating or partial pleating of the mat between the conveyors to obtain the rearrangement of the glass fiber laminations.

Further, the present invention provides apparatus for producing a product from a mat of glass fiber material, the mat containing a bonding substance and having glass fiber laminations extending generally parallel to opposite major surfaces of the mat, which comprises means for processing the mat to rearrange the glass fiber laminations so that at least a major portion of the glass fiber laminations are oriented in directions extending across the thickness of the mat, means for heat-curing the thus-processed mat to harden the bonding substance, means for cutting the cured mat into strips having opposite longitudinal cut faces, means for reorienting the strips into a juxtaposed assembly of the strips in which the cut faces form opposite major surfaces of the assembly, and means for applying adhesive to the strips prior to the reorientation thereof so that the strips are subsequently secured together by the adhesive in the assembly.

BRIEF DESCRIPTION OF THE DRAWINGS

The invention will be more readily understood from the following description of preferred embodiments thereof given, by way of example, with reference to the accompanying drawings, in which:

FIG. 3 shows a view in perspective of strips of a cut, crimped and cured laminar mat of glass fiber being twisted as illustrated in FIG. 2, the strips being spaced laterally apart in FIG. 3 to facilitate illustration;

FIG. 4 shows a view in perspective of one of a plurality of guide members forming parts of the production line of FIG. 1;

FIG. 5 shows a view in perspective of a fibrous board manufactured by the production line of FIG. 1;

FIG. 7 shows in side elevation part of a modified production line;

FIG. 8 shows in plan view another part of the modified production line;

FIG. 9A shows a plan view of a rotary table shown in FIG. 9;

FIGS. 11A, 11B and 11C show diagrammatic side views of broken-away portions of three different glass fiber mats.

DESCRIPTION OF THE PREFERRED EMBODIMENTS

Figures 1, 2:
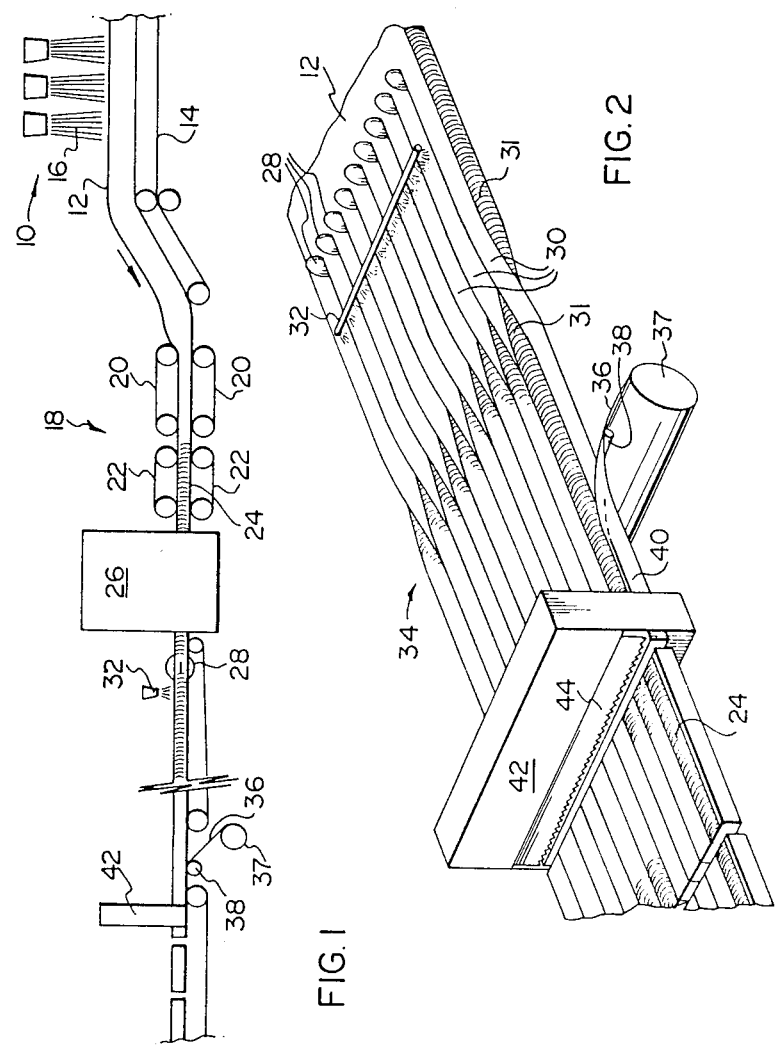
FIG. 1 shows a diagrammatic side view of a production line for the manufacture of a glass fiber product embodying the present invention.
FIG. 2 shows a view in perspective of a part of the production line of FIG. 1.

In FIG. 1, reference numeral 10 indicates generally a forming section for forming a glass fiber mat 12 on a conveyor 14. At the forming section 10, glass fibers 16, together with a binder, fall onto the conveyor 14 to form the mat 12 in a conventional manner, which is well known to those skilled in the art, and which therefore will not be described in greater detail herein.

As is also well known in the art, the glass fibers deposited in the mat in this manner form glass fiber laminations in planes substantially parallel to the major surfaces of the mat.

The mat 12 is advanced by the conveyor 14 along a path of travel which extends through a mat processing section, indicated generally by reference numeral 18. At the mat processing section 18, the upper and lower major surfaces of the mat 12 are contacted by successive pairs of conveyors 20 and 22. The conveyors 22 are driven at a speed which is slower than the speed at which the conveyors 20 are driven and, a pressure is exerted on the mat by both pairs of conveyors, which is controlled by the conveyor separation. Consequently, the mat 12 is crimped by the conveyor pairs 20 and 22.

In this way, the laminations of the mat are rearranged into orientations, described in greater detail hereinafter, which are such that a majority of the laminations instead of being parallel to the major surfaces of the mat, come to be disposed in directions which extend across the thickness of the mat i.e. which extend from the top to the bottom of the mat, as indicated by the lines 24 in FIG. 1.

From the mat processing section 18, the mat 12 passes into a curing oven 26, at which the mat is heated to cure the binder.

Beyond the curing oven 26, the cured mat 12 is cut longitudinally thereof into a plurality of strips by circular cutter blades 28, which are spaced apart across the path of travel of the mat and which are arranged perpendicular to the major surfaces of the mat.

The strips cut from the mat 12 by the cutters 28, and indicated by reference numeral 30 in FIG. 2, are advanced beneath a spray head 32, at which an adhesive is sprayed onto sections of the upper major surface of the mat 12, the surface being cut into such sections by the cutters 28. Alternatively, adhesive may be applied by rollers or other applicator means to the upper major surface.

During their further advance, the strips 30 are twisted through 90° about their longitudinal axes by shoelike guide members 33, which to facilitate illustration have been shown in broken lines in FIG. 3, so that the surface sections, which have been provided with adhesive by the spray head 32, come to be disposed perpendicular to the plane of travel of the mat 12, and the opposite cut faces of the strips 30, one of which is indicated by reference numeral 31 in FIG. 2, are rearranged in coplanar arrays. The strips 30 are then reassembled at the point along the path of travel indicated generally by reference numeral 34, so that the cut faces 31 form the upper and lower major surfaces of the new strip assembly.

Whereas the strips 30 are shown in relatively close lateral juxtaposition in FIG. 2 in order to simplify and clarify the twisting of these strips, it will be apparent that some lateral spacing must be provided between the adjacent strips after they have been cut by the cutters 28 and before they are twisted as described above, and that the strips must then be moved laterally together during their reassembly. Thus, at the point at which the strips 30 are twisted, they are spaced apart laterally, as shown in FIG. 3, by respective ones of the guide members 33.

FIG. 4 shows one of the guide members 33 in greater detail and an arrow in FIG. 4 indicates the direction of advance of the strips.

As can be seen from FIG. 4, the strip guide, which is made of sheet metal, is in the form of a twisted channel of U-shaped cross-section having opposite walls 35 and an intermediate wall 39. At an inlet end, indicated generally by reference numeral 41, the walls 35 and 39 are flared, so as to converge in the direction of advance of the strips. The shoe guide is twisted about its longitudinal axis from the inlet end 41 to an outlet end indicated generally by reference numeral 43 and the outlet end 43 has a cross-sectional shape conforming to that of the strip.

It is to be understood, however, that other guide means, for example guide rollers, could be employed for twisting the mat strips 30.

As will be readily apparent from a consideration of FIG. 2, the spacing of the cutters 28, transversely of the path of travel of the mat 12, and thus the widths of the sections into which the major surfaces of the mat 12 are cut by the cutters 28, determines the thickness, i.e. the vertical dimension, of the assembly at and beyond point 34 of the reassembled strips 30.

The adhesive applied to the upper major surface sections by the spray head 32 secures these surface sections to the opposed surface sections of the formerly lower major surface of the uncut mat 12 when the strips are reassembled in side-by-side relationship at the point 34 and, thus, secures these strips together in this relationship.

The assembly of the thus-reassembled strips 30 is provided, at its underside or lower major surface, with a backing sheet 36 of kraft paper or other suitable backing material from a roll 37, the backing sheet 36 being coated with asphalt or other suitable adhesive at its surface which is brought into contact with the strip assembly and being tensioned by a tension roller 38. If desired, a second backing sheet may be applied to the opposite major surface of the assembly of strips.

As illustrated in FIG. 2, a marginal edge portion 40 of the backing sheet 36 is wrapped around the edge of the strip assembly and over a marginal edge portion of the upper major surface of the strip assembly.

With the backing sheet 36 thus provided, the strip assembly is fed through a cutting station 42, at which the finished product is cut to length by a cutter 44.

An example of the finished product is illustrated in FIG. 5, which shows the cut faces 31 of the strips 30 forming the upper major surface of the product, and which also shows the backing sheet 36 wrapped around opposite edges of the product as at 40.

Figure 6:
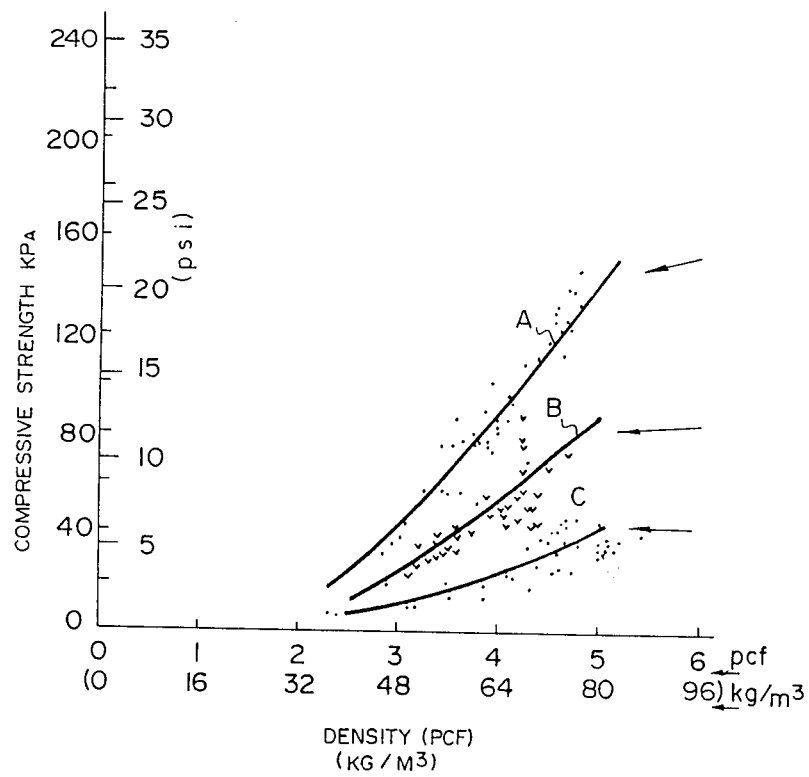
FIG. 6 shows a graph illustrating the compression strengths of different fibrous products.

As indicated above, and as illustrated in FIG. 6, comparative tests have shown that the product manufactured by the above-described process exhibits a substantially enhanced compressive strength as compared with prior art products.

More particularly, in FIG. 6, in which the densities of different products are plotted against their compressive strengths at 10% deformation, line A illustrates the results obtained with the present product, line B illustrates the results obtained from a roofing board manufactured by cutting a cured, uncrimped glass fiber mat into strips and reassembling the strips with the laminations perpendicular to the major surfaces of the board, and C illustrates the results obtained with a board formed of a crimped and cured glass fiber mat. As is apparent from FIG. 6, the compressive strength of the present product is greater, at a density of approximately 40kg/m$^3$, than those of the other products, and the difference increases as the densities increase.

FIGS. 7 and 8 show modified parts of the production line for producing board products without twisting the strips 30.

In FIG. 7, a spray head 50 is shown for applying adhesive to a mat, which is a cured mat formed from an initially laminar mat of glass fibers and binder which is processed and cured, for example by the mat processing section 18 and curing oven 26 as described above with reference to FIG. 1, but which has not been cut longitudinally into strips but which, instead, has been cut by a transverse cutter 54 into boards 52 carried by a conveyor 56.

At a board stacking station indicated generally by reference numeral 58, the boards 52, which are shown in FIG. 8 as being square but which alternatively may be rectangular, are discharged from the conveyor 56 and assembled into a stack indicated generally by reference numeral 60.

Successive stacks 60 are then advanced on a further conveyor (not shown) past backing material supply rolls 62 at opposite sides of this further conveyor. From the supply rolls 62, backing sheets 64 of kraft paper or other backing sheet material are applied to opposite sides of the stacks 60 by applicator and tensioning rolls 65, the backing sheet overlapping the top and undersurfaces of the stacks 60.

With the backing sheets 64 thus applied, the stacks 60 are advanced by the further conveyor past a pair of vertical cutters 66 which are spaced inwardly from the opposite sides of the stacks 60 and which cut parallel to the direction of advance of the stacks so as to cut boards 68 from the remainders of the stacks, which are indicated by reference numerals 70.

Vertical cutters 72 at opposite sides of the path of travel of the stacks then cut the backing sheets 64 and boards to separate the boards 68 from one another.

Beyond the cutters 72, backing material is applied to the opposite sides of the stack remainders 70 and the latter are again cut to form further boards in a similar manner, by apparatus not shown in the drawings, and these steps are repeated until all of the original stacks have been converted into boards.

While the boards manufactured by any of the above-described methods and apparatuses as shown in the drawings are primarily intended for use as insulating roofing boards, they may be used as other products, for example as tank covers, or insulating layers under concrete, which may be poured in place on the boards or precast with the boards.

As shown in FIG. 2, the backing sheet 36 is wrapped around opposite longitudinal edges of the strip assembly and, thus, is wrapped around the laterally outermost edges of the two laterally outermost strips 30.

It may in some cases be preferable to wrap the backing sheet around opposite ends of the reassembled strips 30, for example in order to increase the flexural strength of the final product.

Figure 9:
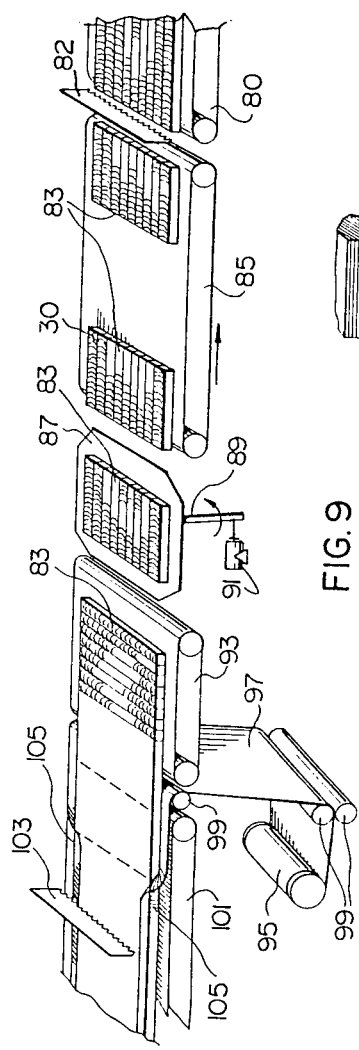
FIG. 9 shows a view in perspective of a modification of parts of the apparatus of FIG. 1.

FIG. 9 shows a modification of the production line of FIG. 1 for wrapping the strip ends in this manner.

As shown in FIG. 9, a conveyor 80 for advancing the reassembled strips along their linear path of travel extends to a cutter 82 for cutting the strip assembly into separate successive lengths, which are indicated by reference numerals 83. A further conveyor 85 carries the cut lengths 83 from the cutter 82 to a rotary table 87, which is mounted on a shaft 89 provided with a drive motor 91 for rotating the shaft 89, and thus the rotary table 87, about the vertical longitudinal axis of the shaft 89.

For transferring the cut lengths to and from the rotary table 87 a first set of rollers 88 and a second set of rollers 90 project upwardly through the surface of the table 87, the rollers 88 and 90 being mounted on shafts 92, and 94, respectively. Electric motors 96 drive the shafts through drive belts 98.

Beyond the rotary table 87, there is provided a conveyor 93 for receiving and conveying the cut lengths, and a backing sheet supply roll 95, from which a backing sheet 97 is fed by guide rollers 99 into contact with the bottom major surface of each of the successive cut lengths 83, the backing sheet 97 being provided with an adhesive, e.g. asphalt for adhesion to such major surfaces.

A conveyor 101 is provided for carrying the backing sheet with the cut lengths 83 thereon past a cutter 103, which serves to cut the backing sheet between the successive cut lengths 83 in order to separate the backing sheet into separate cut portions each adhering to a respective one of the cut lengths 83, and a shoehorn guide 105 at each side of the linear path of travel of the cut lengths 83.

The cut lengths 83 arrive at the rotary table 87 with the strips 30 extending longitudinally of the path of travel of the cut lengths 83. At the rotary table 87, each cut length 83 is rotated, in succession, through 90° in a horizontal plane, so that when the cut lengths are further conveyed onto the conveyor 93, by the rollers 88 or 90, the strips 30 are reorineted so as to extend transversely of the path of travel. Consequently, the shoehorn guides 105 at the opposite sides of the path of travel wrap marginal edge portions of the backing sheet 97 around opposite ends of the strips 30, at opposite edge portions of the cut lengths 83.

Figure 10:
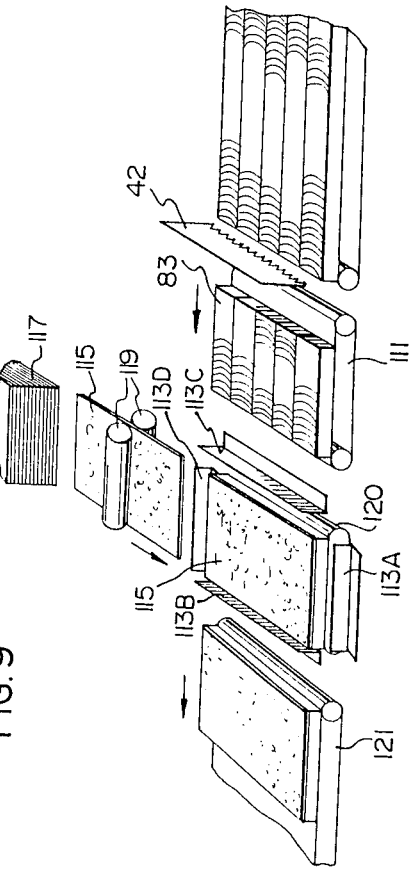
FIG. 10 shows a view in perspective of a different modification of parts of FIG. 1.

The backing sheet 97, like the backing sheet 36 of FIG. 1, is a readily flexible backing sheet made, for example, of kraft paper. However, it may alternatively be desired to provide the cut lengths 83 with backing sheets of rigid or semi-rigid material, for example fiber board, instead of a flexible material. FIG. 10 shows apparatus for this purpose.

As shown in FIG. 10, a conveyor 111 is provided for conveying the cut lengths 83 beyond the cutting station 42 (FIG. 1) to an alignment mechanism comprising vertically movable alignment plates 113A through 113D, at which the cut lengths 83 are deposited in succession.

Fiber boards 115 are supplied in succession to the alignment mechanism from a stack 117 past adhesive applicator rolls 119, by which an adhesive is applied to the underside of each of the boards 115, and the arrival of the boards 115 at the alignment mechanism is timed, in conjunction with the arrival of the successive cut lengths 83, so that successive boards 115 are deposited in succession on respective successive ones of the cut lengths 83, which are then further advanced by a conveyor 120 to a conveyor 121.

More particularly, as each cut length 83 approaches the alignment mechanism, the plate 113B is raised hydraulically while the plates 113A, 113C and 113D are hydraulically downwardly retracted. When the cut length 83 has reached the plate 113B, the plates 113A and 113C are raised and one of the boards 115 is then advanced onto this cut length and the plate 113D is raised. The four plates 113A through 113D are then moved inwardly to align the cut length 83 and its board 115, whereupon the four plates are lowered and the cut length 83 and its board 115 are advanced by the conveyor 120 onto the conveyor 121.

For further clarification of the glass fiber mat lamination structures mentioned hereinabove, reference is now made to FIGS. 11A–11C.

FIG. 11A shows a side view of a portion of a laminar glass fiber mat of conventional manufacture, such as the mat 12 of FIG. 1, and shows glass fiber laminations, indicated by reference numeral 123 extending generally parallel to opposite major surfaces 125 of the mat.

FIG. 11B shows a conventionally manufactured pleated glass fiber mat, in which the generally parallel laminations of FIG. 11A have been deformed into laminations 127 which, as can be seen from FIG. 11B extend in generally serpentine paths along the mat. Such a mat may be heat cured and cut into strips by cutters 28 (FIG. 1) for reassembly as described in detail above in practicing the present invention, and thus it is to be understood that the mat processing section 18 of FIG. 1 may, alternatively, be a pleating section. However, pleated mats have the disadvantage of weak spots at positions, indicated by reference numerals 129 in FIG. 11B, at which the glass fiber laminations are bent.

It is therefore preferred, in the practice of the present invention, to employ a crimped mat, in which the originally parallel glass fiber laminations 123 are rearranged by the mat processing section 18 as described above, so that at least a major portion of the rearranged glass fiber laminations extend across the thickness of the mat. In FIG. 11C, the thus-arranged glass fiber laminations are shown and are indicated by reference numeral 131.

However, it is emphasized that, by varying the speeds and the spacings of the conveyor pairs 20 and 22, the pattern of the rearranged glass fiber laminations extending across the thickness of the mat may be correspondingly varied to a considerable extent. Therefore, it should be understood that the glass fiber laminations pattern illustrated in FIG. 11C is provided as a typical example of such a pattern, but that the invention is by no means restricted to the glass fiber lamination pattern illustrated in FIG. 11C.

Accordingly, the expression "crimped", as employed herein and in the accompanying claims, means a condition of the mat such that the glass fiber laminations have been reoriented from their initial condition, such as that shown in FIG. 11A, without producing folds in the mat and so that the surface of the mat does not have weak areas such as those which are produced by pleating.

The thus-crimped fibers are both curved and intermingled or interlocked to increase the resistance to buckling of the final product.

As will be apparent to those skilled in the art, various modificiations may be made in the product, apparatus and method described above. Accordingly, it is to be understood that the present invention is not restricted to the details of the embodiments illustrated in the accompanying drawings but may be modified within the scope of the accompanying claims.

We claim:

1. A fibrous material product formed from a mat of glass fibers containing a bonding substance and having fiber laminations which have been rearranged from a first orientation in which said laminations extended generally parallel to opposite major surface of said mat to a second orientation in which at least a major portion of said fiber laminations (24) extend transversely across the thickness or height of said mat, said mat being heat-cured and cut perpendicular to the major surfaces of said mat to form a plurality of parallel strips (30) having opposite longitudinal cut faces (31), and means securing said strips together in side-by-side relationship to form an assembly with said cut faces forming opposite major surfaces of said assembly, and said major portion of said fiber laminations extending transversely across the thickness of said assembly between the opposite major surfaces thereof.

2. A fibrous material product as claimed in claim 1, wherein said means securing the strips together comprise adhesive on adjacent longitudinal sides of said strips.

3. A fibrous material product as claimed in claim 1, wherein said means securing the strips together comprise a backing sheet and adhesive securing said backing sheet to at least one of the major surfaces of the assembly.

4. A fibrous material product as claimed in claim 1, wherein said means securing the strips together comprise a backing sheet and adhesive securing the backing to one of the major surfaces of said assembly, to opposite edges of said assembly and to marginal opposite edge portions of the other major surface of said assembly.

5. A fibrous material product as claimed in claim 1, further comprising a backing sheet and adhesive means for securing said backing sheet to one of said major surfaces of said assembly, said backing sheet being wrapped around opposite ends of said strips and being secured by said adhesive means to said opposite ends and to a marginal edge portion of the other major surface of said assembly.

6. A fibrous material product as claimed in claim 1, wherein said strips are cut longitudinally from said mat.

7. A fibrous material product comprising a plurality of strips cut longitudinally from a heat-cured glass fiber mat, the mat having glass fiber laminations at least a major portion of which are disposed in directions extending across the thickness of the mat, the strips having side faces formed by sections of opposite major surfaces of said mat, said sections being rearranged and juxtaposed in face-to-face relationship, and adhesive means on said side faces for securing said strips together with said side faces in said relationship to form a board in which said major portion of said laminations extend transversely across the thickness of said board between opposite major surfaces thereof.

8. A fibrous material product as claimed in claim 7, further comprising a backing sheet adhered to one of said major surfaces of said board.

9. A fibrous material product as claimed in claim 8, wherein said backing sheet is wrapped around opposite ends of said strips at opposite edges of said board and adhered to said strip opposite ends and to marginal edge portions of the other major surfaces of said board adjacent said opposite edges of said board.

10. A fibrous material product as claimed in claim 7, wherein said mat from which said strips are cut is a crimped mat.

11. A fibrous material product as claimed in claim 7, wherein said mat from which said strips are cut is a plated mat.

12. A fibrous material board, comprising a plurality of parallel strips (30) cut longitudinally from an elongate crimped and heat-cured laminar mat (12) of glass fibers bonded by a bonding substance, and means securing said strips together in longitudinal juxtaposition with longitudinal sections of major surfaces of said crimped mat forming side faces of said strips and with said side faces secured together in juxtaposed relationship along planes spaced apart across the board such that the fiber laminations extend transversely across the thickness of the board between the major surfaces thereof.

* * * * *